Dec. 16, 1941.                S. S. BYERS                2,266,702
              METHOD OF REPAIRING LEAKY CRIMPED JOINTS
                        Filed Nov. 13, 1939
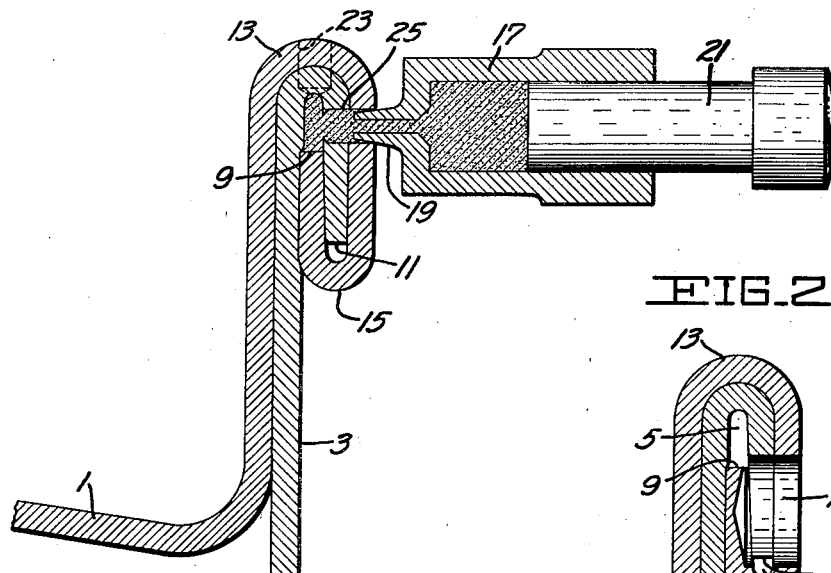
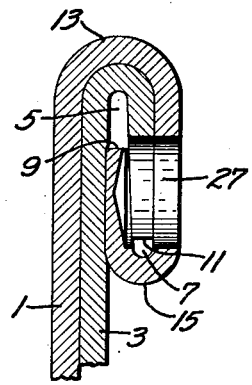
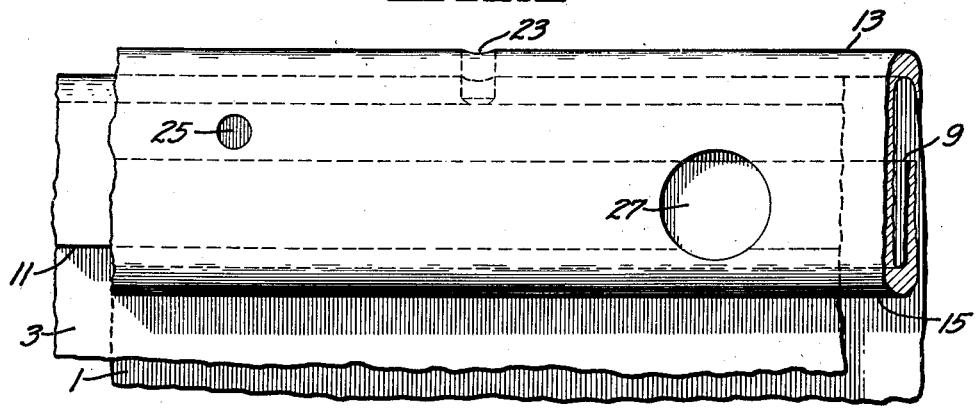
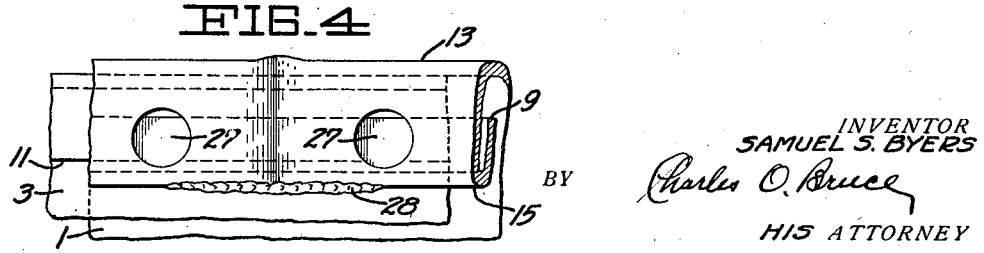
INVENTOR
SAMUEL S. BYERS
BY Charles O. Bruce
HIS ATTORNEY Patented Dec. 16, 1941

2,266,702

UNITED STATES PATENT OFFICE 2,266,702

METHOD OF REPAIRING LEAKY CRIMPED JOINTS

Samuel S. Byers, Oakland, Calif.

Application November 13, 1939, Serial No. 304,055

7 Claims. (Cl. 113—120)

My invention relates to metal drums having the body and head portions joined by crimping the edges thereof, and relates more particularly to a method of repairing leaks occurring in seams of this type.

Metal drums having their head and body portions crimped to form a seam or joint are commonly employed in the handling and transportation of liquids such as gasoline, oil, etc. In the course of use, such drums are subjected to continual abuse which produces distortion of the seams, causing the folds of the seams to open up and permit leakage of the contents of the drum. These seams when originally formed are made liquid tight by introducing between the folds thereof at the time of crimping, a glue or equivalent substance.

Many ways have been tried to cheaply and successfully repair these leaks. One method which has been tried involved recrimping of the joint by special machinery, but without success. The method most generally used at the present time is to weld the joint, but it has been found that to obtain successful results the entire circumferenece of the drum at the joint has to be welded and this proves to be a costly proposition. Attempts to confine the welding to the region of the leak have proven unsuccessful. This is explainable by the fact that due to the application of heat, the fold is expanded just enough so that under small pressures encountered during use of the drum subsequently, a leak will inevitably develop at either end of the welded section. The development of such leaks is further facilitated by reason of the fact that the welding heat serves to burn the glue out from the seam. Another method tried, in attempting to stop leaks via the seams of metal drums, is to cut a small section at each side of the leak and weld the exposed ends of the seams, and then weld the small section back into place. Of all the methods discussed above, the complete circumferential weld has proven to be the most successful as well as the most costly method.

It is the object of my invention to provide an improved method for repairing leaky joints of the crimped type.

Another object of my invention is to provide an improved method of repairing leaky joints of the crimped type which method requires no specially designed tools.

Another object of my invention is to provide an improved method for repairing leaky joints of the crimped type which is simple and does not involve the application of heat to the joint.

A further object of my invention is to provide an improved method for repairing leaky joints of the crimped type which can be confined to the location of the leak.

A further object of my invention is to provide an improved method of the above character which can be carried out in the field, thus avoiding the necessity and expense of returning an article with a leaky seam to some repair station for servicing.

Additional objects of my invention will be brought to light in the following description of the same, taken in conjunction with the accompanying drawing wherein—

Figure 1 illustrates two different ways of applying my invention in the repairing of leaks in a crimped seam, the seam being shown in section for the purpose.

Figure 2 illustrates another way of applying my method to a seam of the same character.

Figure 3 is a front elevational view of a seam of the same character, illustrating the appearance of the same when operated upon in accordance with the improved methods to be described by me.

Figure 4 is a front elevational view of a dented seam which has been repaired in accordance with the method of my invention.

The seam or joint illustrated in the drawing is characteristic of the joint formed by crimping the cover 1 and cylindrical wall or body 3 to form a drum for the handling of liquids. In developing my improved method for the repair of leaks in seams of this general type, I take advantage of certain structural characteristics thereof, namely the presence of longitudinal channels 5, 7 running the entire length of the seam. Such channels are inherently formed in the crimping operation by reason of the fact that the edges 9, 11 of the crimped members are of appreciable thickness and thereby prevent contact between opposing surfaces of a fold. One of these channels 5 will be formed in the upper edge or rim portion 13 of the joint, whereas the other channel will be formed in the overhanging edge 15 of the joint which lies adjacent the body 3 of the drum. When a leak occurs in a drum of this type, it is usually due to a slight separation of the folds of the seam at some localized region, brought about by rough handling or other abuse.

I have found that such leaks can be remedied in a very simple and efficacious manner by introducing into the seam channels in the region of the leak and preferably under pressure, a sealing cement or equivalent material, which has the ability to flow under pressure into crevices leading from the channels which may have been opened up through slight separation of the folds of the seam. Such suitable sealing material may be purchased upon the market under the trade-name "Permatex." To introduce the sealing material, I may treat each channel separately and independently, in which case I drill a small opening through the wall structure of the seam to each of the channels, the opening being of a size to receive the nozzle of a pump or pressure gun, a very simple form of which is illustrated in Figure 1 as comprising a barrel 17 having a nozzle 19 and a plunger 21 fitting the barrel and adapted to force the contents of the barrel into the channel upon application of pressure to the plunger. A grease gun such as is customarily employed in servicing automobiles would be admirably suited for the purpose. In treating the upper channel, the opening may be drilled through the upper edge or rim of the joint as indicated at 23, or the channel can be reached by drilling through the side walls of the joint as indicated at 25. The lower channel may be exposed in like manner. Where the spacing between the two channels is not too great, an opening 27 large enough to expose both at the same time may be made through the side walls of the joint, whereby both channels might be treated simultaneously.

It happens at times, however, when subjected to excessive abuse or rough handling, the joint is so dented and distorted at points therein as to spread the folds to an excessive degree, thereby precluding the joint from holding any sealing material injected therein in accordance with the procedure outlined above. When a condition of this type is found to exist, the joint may be treated in a slightly different manner, such as shown in Figure 4, to successfully remedy the leaky condition thereof. As a first step in this method, the overhanging edge 15 of the joint is first welded, as at 28, to the body of the drum along the region of the leak. Inasmuch as severe dents or distortions of this aggravated type will not ordinarily allow free flow of sealing material along the normal channels, a pair of openings 27 into the channels, one at each end of the welded portion, is recommended in lieu of a single opening, and the sealing material is introduced into the seam or joint through these openings under pressure, thus effectively sealing the leaky portion of the joint.

Where the sealing material is of a highly viscous material or is self-hardening and the holes are of small diameter, it will not be necessary to plug the holes through which the material is injected into the joint, as the material itself will seal the openings. However, if the holes or openings are relatively large, or if extra strength or assurance is desired, the openings may be plugged, welded or soldered.

From the above description it will be apparent that I have fulfilled all the objects of my invention as previously set forth by me. I, however, do not desire to be limited in my protection to the specific details of the methods as described, as they are susceptible to modification and variation to a certain extent without departing from the spirit of the invention.

I claim:

1. The method of repairing a leaky crimped joint, which comprises forming an opening to the interior of said joint and welding the free edge of said joint in the region of leak to the adjacent main wall of the item having such joint, and forcing a sealing material through said opening under pressure into said joint in the same region.

2. The method of repairing a leaky crimped joint, which comprises forming an opening to the interior of said joint and substantially sealing the gap between the free edge of said joint in the region of leak and the adjacent main wall of the item having such joint, and forcing a sealing material through said opening under pressure into said joint in the same region.

3. The method of repairing leaky crimped joints having spaced interior longitudinal channels therethrough formed during crimping, which comprises forming an opening through the wall structure of said joint sufficient to expose said spaced channels to the atmosphere at the region of leak and substantially sealing the gap between the free edge of said joint in the region of leak and the adjacent main wall of the item having said joint, and subsequently introducing a sealing material into said spaced channels through such opening.

4. The method of repairing leaky joints which comprises welding the overhanging edge of said joint in the region of leak to the adjacent main wall of the item having such joint and providing an opening to the interior of said joint at a localized point in the region of leak, and forcing a sealing material under pressure into said joint through said localized opening.

5. The method of repairing a leaky dented joint of the crimped type normally having a longitudinal channel therethrough formed during crimping, comprising forming an opening to the interior of said joint at each side of a dent and welding the overhanging edge of said joint in the region of such dent, to an adjacent wall of the article having such joint, and forcing sealing material through said openings into said channel at each side of said dent.

6. The method of repairing a leaky dented joint of the crimped type normally having a longitudinal channel therethrough formed during crimping, comprising forming an opening to the interior of said joint at each side of a dent and sealing the overhanging edge of said joint in the region of such dent to the body of the article having such joint, and forcing a sealing material therein through each of said openings.

7. The method of repairing a leaky dented joint of the crimped type normally having spaced longitudinal channels therethrough formed during crimping, comprising forming an opening to the interior of said joint at each side of a dent sufficient to expose both channels and welding the overhanging edge of said joint in the region of a dent to the body of the article having such joint, and forcing a sealing material into said spaced channels through each of said openings.

SAMUEL S. BYERS.